United States Patent [19]

Sutton, Jr.

[11] Patent Number: 4,675,146

[45] Date of Patent: Jun. 23, 1987

[54] WELD MONITOR AND FAILURE DETECTOR FOR NUCLEAR REACTOR SYSTEM

[75] Inventor: Harry G. Sutton, Jr., Mt. Lebanon, Pa.

[73] Assignee: The United States of America as represented by the United States Department of Energy, Washington, D.C.

[21] Appl. No.: 544,161

[22] Filed: Oct. 21, 1983

[51] Int. Cl.⁴ ............................................. G21C 17/00
[52] U.S. Cl. ..................................................... 376/250
[58] Field of Search ........................ 376/249, 250, 451

[56] References Cited

U.S. PATENT DOCUMENTS

| | | | |
|---|---|---|---|
| 3,157,580 | 11/1964 | Williams | 376/451 |
| 3,664,922 | 5/1972 | Piwinsky et al. | 376/249 |
| 4,033,813 | 7/1977 | Holt et al. | 376/250 |
| 4,259,152 | 3/1981 | Pennell et al. | 376/250 |

*Primary Examiner*—Sal Cangialosi
*Attorney, Agent, or Firm*—Stephen D. Hamel; Judson R. Hightower

[57] ABSTRACT

Critical but inaccessible welds in a nuclear reactor system are monitored throughout the life of the reactor by providing small aperture means projecting completely through the reactor vessel wall and also through the weld or welds to be monitored. The aperture means is normally sealed from the atmosphere within the reactor. Any incipient failure or cracking of the weld will cause the environment contained within the reactor to pass into the aperture means and thence to the outer surface of the reactor vessel where its presence is readily detected.

4 Claims, 3 Drawing Figures

WELD MONITOR AND FAILURE DETECTOR FOR NUCLEAR REACTOR SYSTEM

GOVERNMENT CONTRACT

This invention was conceived during performance of a contract with the U.S. Government designated DE-AC-76-CLO-2395.

BACKGROUND OF THE INVENTION

This invention relates to a weld failure detector for inaccessible welds and, more particularly to a detection system for monitoring the integrity of inaccessible welds throughout the life of a nuclear reactor and for providing a responsive signal which is indicative of weld failure.

In nuclear reactors of which the liquid metal fast breeder type is an example, the reactor core is typically supported at its bottom portion by a core support structure which in turn is affixed to the reactor vessel wall by welds. Since the control rods are reciprocally inserted from the top portion of the core, monitoring the integrity of the welds which support the core support structure is an important factor.

SUMMARY OF THE INVENTION

The basic nuclear reactor system is conventional and comprises a steel nuclear reactor vessel having an outer wall surface and an inner wall surface and reactor vessel structural support means projecting inwardly from the vessel inner wall surface. A reactor core is retained within the reactor vessel and during reactor operation, heat transfer coolant means flows upwardly through the reactor core under a pressure which is greater than the pressure of the atmosphere exteriorly of the vessel. The reactor core is supported within the reactor vessel by a steel reactor core support structure and circumferential weld means affix the reactor core support structure to the inwardly projecting vessel support structure.

In accordance with the present invention, there is provided a weld integrity monitor means which comprises small aperture means opening from the outer wall surface of the reactor vessel and extending through the wall of the reactor vessel and through the inwardly projecting reactor vessel support structure and thence completely through the circumferential weld means. Under normal operating conditions, all portions of the aperture means are normally sealed from the coolant-means-containing environment within the reactor vessel. Detection means are provided exteriorly of the reactor vessel for detecting the egress of any of the coolant means from the reactor vessel via the aperture means. Any egress of the coolant means is indicative of incipient failure of the critical circumferential weld means.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENTS

Figure 1:
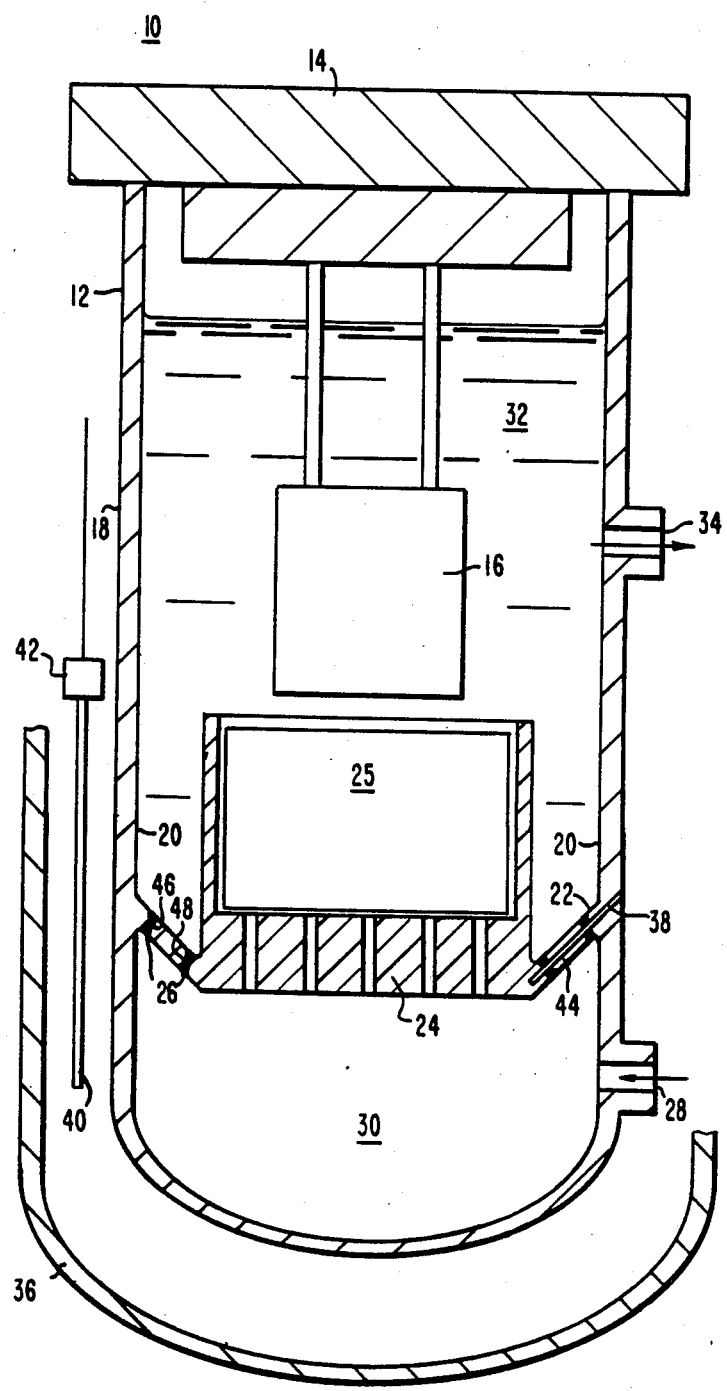
FIG. 1 is a diagrammatic elevational view, shown principally in section, illustrating the essential components of a liquid-metal fast-breeder nuclear reactor with the present weld monitoring and detection system installed.

The nuclear reactor system 10 as shown in FIG. 1 is of the liquid-metal fast-breeder type and only the essential components are diagrammatically illustrated since these are conventional, except for the present monitoring and detection system. The system 10 comprises a nuclear reactor vessel 12 provided with a sealed roof structure 14 from which the control assembly 16 is supported.

The reactor vessel 12 has an outer wall surface 18 and an inner wall surface 20 from which reactor vessel structural support means 22 inwardly project. A steel reactor core support structure 24 supports the reactor core 25 within the reactor vessel 12. Circumferential weld means 26 affix the core support structure 24 to the inwardly projecting vessel support structure 22. During operation of the reactor, heat transfer coolant means such as liquid sodium flows from the heat exchange unit (not shown) through the inlet nozzle 28 into the inlet plenum 30, through the reactor core 25 to the outlet plenum 32 and thence through the outlet nozzle 34 to the heat exchange unit. As is customary, a reactor guard vessel 36, only a portion of which is shown, is provided about the reactor vessel 12.

In accordance with the present invention, a weld integrity monitor means comprising a small aperture means 38 opens from the outer wall surface 18 of the reactor vessel 12 and extends through the wall of the reactor vessel 12 and through the inwardly projecting reactor vessel structural support means 22 and thence through the circumferential weld means 26. Under normal reactor operating conditions, all portions of the small aperture means 38 are normally sealed from the coolant-means-containing environment within the reactor vessel 12.

In the event of a failure or crack or any type of incipient failure of any weld 26, the coolant within the reactor vessel 12, such as liquid sodium, will traverse the small aperture 38 and egress from the outer wall 18 of the reactor vessel.

Detecting means are positioned exteriorly of the reactor vessel 12 and preferably within the guard vessel 36 and these detecting means 40 are responsive to the presence of any liquid sodium to provide an indicia of weld failure. The detecting means 40 can take any of a variety of forms such as a liquid sodium detector or aerosol leak detection system in the guard vessel or a radiation detection system. Such systems are diagrammatically represented by the block 42 and these are well known in the art.

In its preferred form, the support structure for the reactor core comprises a hollow, inverted frusto-conical support member or support cone 44 and this is welded at the upper circumferential edge portion thereof 46 to the reactor vessel structural support 22 and the support cone 44 is also circumferentially welded at the lower circumferential edge portion thereof 48 to the steel reactor core structural support. The small aperture means 38 thus extends through the wall of the reactor vessel 12 and through both of the circumferential welds 26, with the detecting means essentially located intermediate the reactor vessel 12 and the guard vessel 36. To increase the reliability of the detection system, a plurality of the small detection holes may be utilized and they may be bored at spaced intervals such as every 10° or every 30° of circumference.

Figure 2:
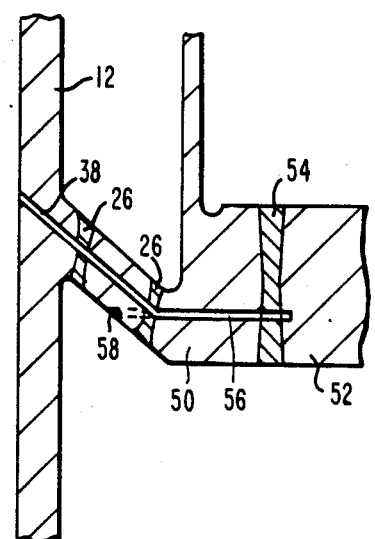
FIG. 2 is a fragmentary enlarged sectional view of an alternative detection system which is operable to monitor additional welds.

In FIG. 2 is shown another embodiment wherein an outer ring member 50 forms a part of the core support structure and the primary core support structure 52 is affixed thereto by an additional core plate weld 54 which is also desired to be continuously monitored. In order to effect this monitoring, additional aperture means 56 is bored through the outer ring support structure 50 and traverses the weld 54 and the additional aperture means 56 opens into the aperture means 38 which traverses the welds 26. After the aperture means 56 is bored, its lead-in portion is plug welded at 58 to seal the aperture 56 from the environment within the vessel 12. In this manner, all critical welds are continuously monitored. Of course, the apertures 56 can be spaced at regular intervals such as every 10° or 30°.

Figure 3:
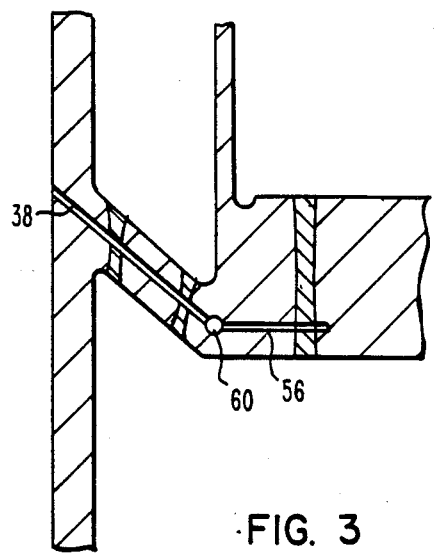
FIG. 3 is a fragmentary sectional view of still another detection system for monitoring a plurality of critical welds.

In FIG. 3 is shown yet another embodiment which generally corresponds to that shown in FIG. 2 except that a circumferential aperture manifold means 60 is provided within the outer ring structure and this manifold 60 has opening therein the additional apertures 56 and the primary small apertures 38. This ensures that any leak or incipient crack resulting in any egress of liquid sodium from the environment within the operating reactor will be promptly detected.

While the present weld monitor and failure detector has particular utility with respect to a liquid metal fast breeder reactor, such a monitor and detector can also be used with other types of nuclear reactors.

I claim:

1. In combination with a nuclear reactor system, a detection system for monitoring the integrity of inaccessible weld means throughout the life of said reactor system and for providing a responsive signal which is indicative of weld failure, said nuclear reactor system including a steel nuclear reactor vessel having an outer wall surface and an inner wall surface and reactor vessel structural support means projecting inwardly from said vessel inner wall surface, reactor core means retained within said reactor vessel, heat transfer coolant means which during reactor operation flows upwardly through said reactor core means under a pressure which is greater than the pressure of the atmosphere exteriorly of said reactor vessel, a steel reactor core support structure supporting said reactor core within said reactor vessel, and circumferential weld means affixing said reactor core support structure to said reactor vessel structural support means, said detection system comprising:

weld integrity monitor means comprising small aperture means opening from the outer wall surface of said reactor vessel and extending through the wall of said reactor vessel and through said inwardly projecting reactor vessel structural support means and completely through said circumferential weld means, and all portions of said aperture means normally sealed from the coolant-means-containing environment within said reactor vessel; and detecting means positioned exteriorly of said reactor vessel for detecting the egress of any of said coolant means from said reactor vessel via said aperture means, which coolant means egress is indicative of failure of said circumferential weld means.

2. The combination as specified in claim 1, wherein said nuclear reactor system comprises a fast-breeder liquid-metal reactor system, a guard vessel surrounds said reactor vessel and is spaced therefrom, a hollow inverted frusto-conical support structure is circumferentially welded at the upper circumferential edge portion thereof to said reactor vessel structural support means and is also circumferentially welded at the lower circumferential edge portion thereof to said steel reactor core structural support means, said weld integrity monitor means comprising small aperture means opening from the outer wall surface of said reactor vessel and extending through the wall of said reactor vessel and through both of said circumferential welds which affix said hollow inverted frusto-conical support to said inwardly projecting structural support means and said reactor core structural support means, and said detecting means is essentially located intermediate said reactor vessel and said guard vessel.

3. The combination as specified in claim 2, wherein said steel reactor core structural support means comprises an outer ring structure and a central portion, said outer ring structure is circumferentially welded at its peripheral surface to the lower circumferential edge portion of said hollow inverted frusto-conical support structure, said outer ring structure is circumferentially welded at its inner surface to the central portion of said reactor core structural support means, said weld integrity monitoring means also includes additional small aperture means extending through said circumferential weld which connects said central portion and said outer ring structure of said reactor core structural support means, and said additional aperture means connecting with said small aperture means and also normally sealed from the coolant-means-containing environment within said reactor vessel.

4. The combination as specified in claim 3, wherein said outer ring structure of said reactor core support means includes therein a circumferential manifold aperture means which is normally sealed from the coolant-means-containing environment within said reactor vessel, and said manifold aperture means communicating with said small aperture means and said additional aperture means.

* * * * *